July 21, 1925. 1,547,144
N. H. JENSEN, NOW BY JUDICIAL
CHANGE OF NAME N. HOINESS
AUTOMATIC CONTROL FOR MOTION PICTURE PROJECTORS
Filed Aug. 29, 1922 2 Sheets-Sheet 1
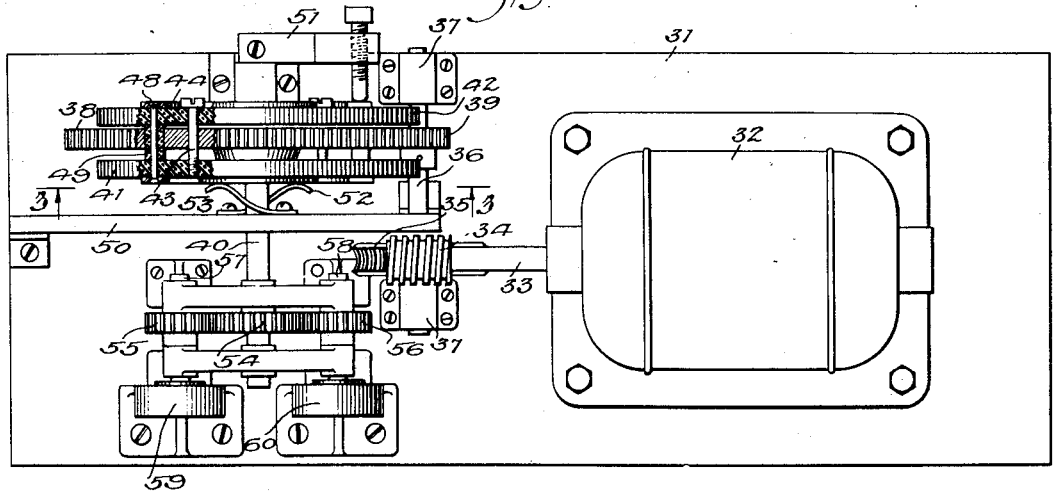
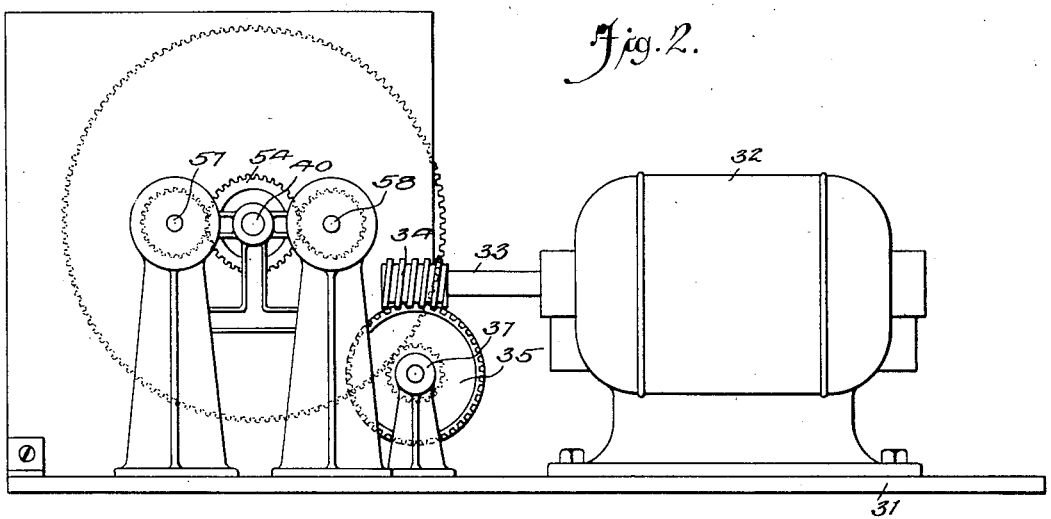
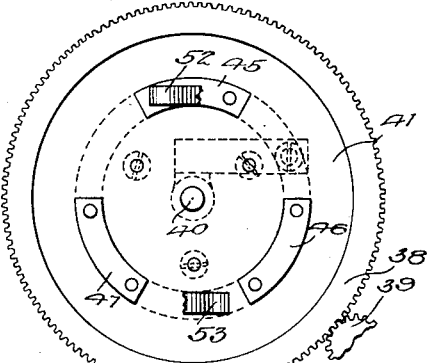
INVENTOR
Niels H. Jensen
BY
ATTORNEYS

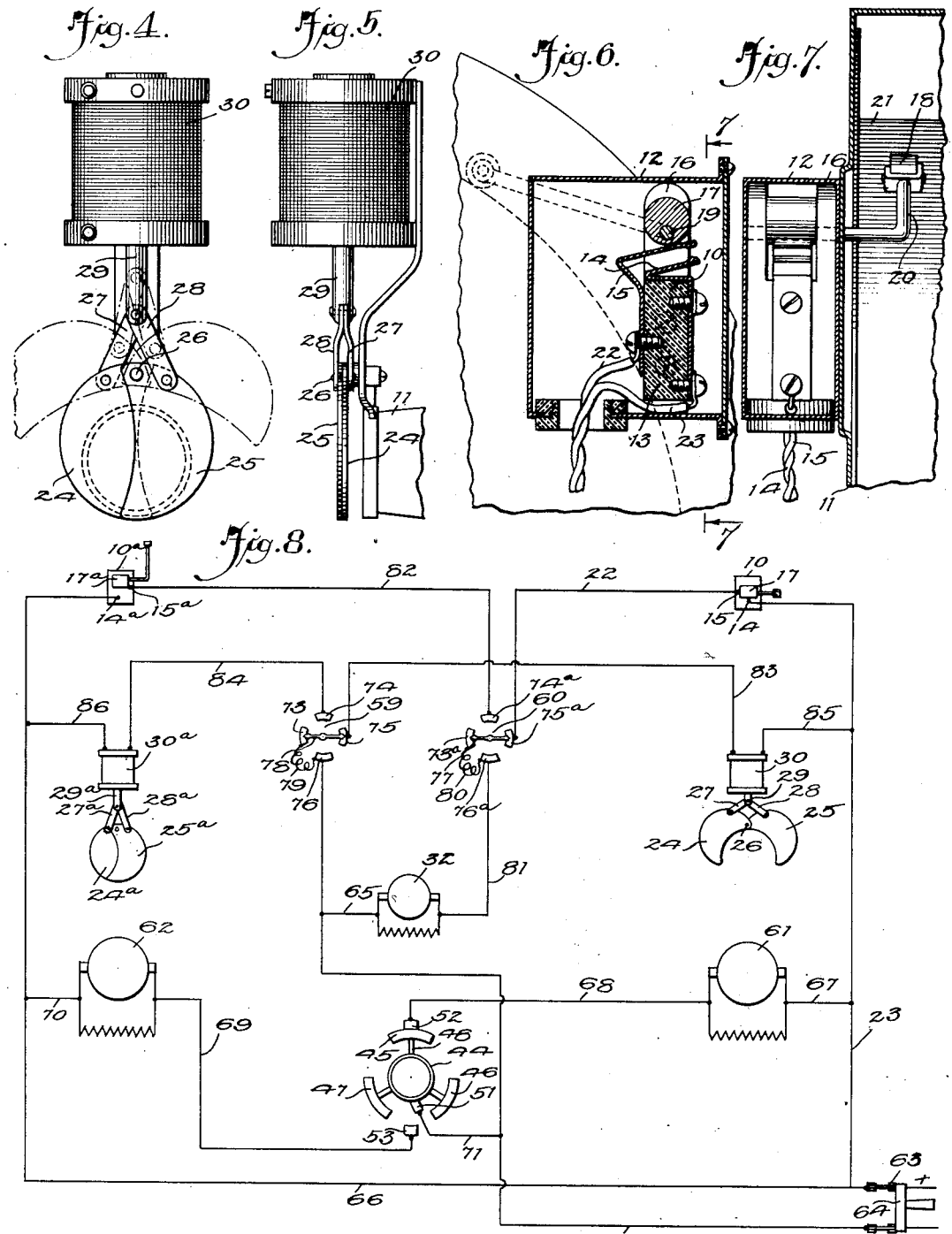

Patented July 21, 1925.

1,547,144

UNITED STATES PATENT OFFICE.

NIELS H. JENSEN, NOW BY JUDICIAL CHANGE OF NAME NIELS HOINESS, OF BROOKLYN, NEW YORK, ASSIGNOR OF ONE-FOURTH TO JAMES E. SOONS, OF NEW YORK, N. Y.

AUTOMATIC CONTROL FOR MOTION-PICTURE PROJECTORS.

Application filed August 29, 1922. Serial No. 585,027.

*To all whom it may concern:*

Be it known that I, NIELS H. JENSEN, now by judicial change of name, NIELS HOINESS, a subject of the King of Norway, and a resident of the city of New York, borough of Brooklyn, in the county of Kings and State of New York, have invented new and useful Improvements in Automatic Controls for Motion-Picture Projectors, of which the following is a full, clear, and exact description.

This invention relates to automatic controls for motion picture projectors.

In moving picture houses provided with more than one picture projector an interval often occurs in changing from one projector to the other. This break in the program is sometimes objectionable, particularly if the picture being shown extends over several reels. It is in order to eliminate this objection that the inventor has constructed his device.

The general object of this invention is the provision of an efficient, automatic change-over device for setting one motion picture projector in operation to project a picture onto the screen at the instant that the other motion picture projector has completed the last of a film mounted on its reel.

This object is accomplished by providing means for setting one projector motor in operation as soon as the film of another projector has been completed, means for operating the dowsers provided in conjunction with the motion picture projectors, a motor for operating the means for controlling the projector motors and the means for operating the dowsers, and switching means in conjunction with each projector reel for setting the motor in operation when only a certain length of film remains on the reel.

This and other objects of the invention will be more clearly understood from the following detailed description and accompanying drawings.

Figure 1 is a top plan view of the automatic control;

Figure 2 is a side elevation of the device shown in Figure 1;

Figure 3 is a detailed plan view of a disk mounted on the control device;

Figure 4 is a front elevation of a dowser operated by a solenoid;

Figure 5 is a side elevation of the dowser shown in Figure 4 when it is closed;

Figure 6 is a vertical section through the switch provided in conjunction with each reel;

Figure 7 is a section on the line 7—7, Figure 6;

Figure 8 is a diagram of the electric connection.

Referring to the above-mentioned drawings, the automatic control device includes a switch assemblage 10 mounted in conjunction with each of the projector reels 11. This switch assemblage consists of a casing 12 attached to the projector casing, as shown in Figure 7. Two plates 16 are mounted in the casing 12 and serve to support an insulating block 13. Two spring contact arms 14 and 15 are mounted on the insulating block in spaced relation to one another but in alinement. Rotatably mounted in the plate 16 and extending into the projector casing is a shaft 19 to which an eccentric disk 17 is attached. The eccentric disk is located between the plates 16 and in alinement with the spring arm 15. Integral with the outer end of the shaft is an arm 20 which extends at right angles to it and carries a weighted roller 18. This roller is adapted for riding on the film 21. Conductors 22 and 23 are connected to the contact arms 15 and 14, respectively.

Referring to Figures 4 and 5, dowsers in conjunction with solenoids are shown. Each dowser includes two plates 24 and 25 rotatably mounted on a shaft 26. Members 27 and 28 connect the plates 24 and 25, respectively, to an armature 29. The armature 29 is slidably mounted for movement lengthwise of the solenoid 30, and normally the dowser stands in the position shown by full lines in Figure 4, preventing the emission of rays of light from the projector. When the solenoid 30 is energized the armature 29 is drawn upward, raising the plates 24 and 25 to the position shown by dotted lines.

Referring to Figures 1 to 3, inclusive, of this device the driving mechanism includes a motor 32 mounted on a foundation 31. Fixed on the shaft 33 of the motor 32 is a worm 34 which meshes with a worm gear 35 carried by a shaft 36 rotatably mounted in bearings 37 located on the foundation 31. A gear 39 attached to the shaft 36 meshes with a large gear 38 fixed to a shaft 40 rotatably mounted in bearings mounted on the foundation 31. Attached to the gear 38 by means of bolts 43 are two disks 41 and 42. These disks are made of fiber or some other material that makes a good insulator. An annular plate 44 is mounted on the outer face of the disk 42 and is electrically connected with plates 45, 46 and 47 mounted on the disk 41 by means of conductors 48 extending through the gear 38 and insulated therefrom by means of insulating sleeves 49. The annular plate 44 is connected with one terminal of a source of electrical energy through the brush 51. Two brushes 52 and 53 are carried by a plate 50 and are so positioned that they contact with the plates 45, 46 and 47 as the disk 41 rotates. The shaft 40 through a gear 54 drives two gears 55, 56 and these gears in turn drive snap switches 59 and 60, respectively, through shafts 57 and 58 on which they are respectively mounted. The trains of gears set forth above have been so designed that the disk 41 is rotated one-sixth of a turn while the snap switches 59 and 60 are rotated through one-quarter of a turn.

Referring to Figure 8, a source of electrical energy 63 is shown. Connection is established with this source of electrical energy 63 by means of a switch 64. The positive pole of the switch is connected to the spring contact arms 14 and 14$^a$ of two switch assemblages 10 and 10$^a$, used in conjunction with two different projectors, by means of conductors 23 and 66, respectively. A motor 61 for driving one motion picture projector is connected to the conductor 23 by a conductor 67 and to the brush 52 by a conductor 68, while a motor 62 for driving a second motion picture projector is connected to the brush 53 by a conductor 69 and to the conductor 66 by a conductor 70. The brush 51 which is associated with the annular plate 44 is connected to the negative pole of the switch 64 through conductors 71 and 72. The two-way snap switches 59 and 60 referred to in a preceding paragraph each have four poles 73, 74, 75, 76 and 73$^a$, 74$^a$, 75$^a$, 76$^a$, respectively. Opposite poles of the switch 59 may be connected by means of an arm 78 operated through the shaft 57, while opposite poles of the snap switch 60 may be connected by means of an arm 77 operated through the shaft 58. The poles 73 and 75 are connected by a conductor 79 while the poles 73$^a$ and 76$^a$ are connected by conductor 80. The pole 75$^a$ of the snap switch 60 is connected to the spring contact arm 15 through conductor 22. Pole 74$^a$ is connected through conductor 82 to the spring contact arm 15$^a$ of the switch assemblage 10$^a$. Pole 75 of the snap switch 59 is connected to one terminal of the solenoid 30 through conductor 83 while pole 74 is connected to one terminal of the solenoid 30$^a$ used in conjunction with a second projector by means of conductor 84. This solenoid 30$^a$ operates an armature 29$^a$ which in turn serves to operate members 27$^a$ and 28$^a$ for operating the dowser plates 24$^a$ and 25$^a$. The other terminals of the solenoids 30 and 30$^a$ are connected to the conductors 23 and 66 through conductors 85 and 86, respectively. The pole 76 of the snap switch 59 is connected to the conductor 72 while the pole 76$^a$ of the snap switch 60 is connected through a conductor 81 to the motor 32. This motor in turn is connected to the conductor 72 by means of conductor 65. The rollers 17 and 17$^a$ serve to operate the spring contact arms 15, 15$^a$, respectively.

*Operation.*

While the projector 11 is in operation the arm 20 is retained in a raised position by the film 21 and the spring contact arms 14 and 15 remain separated. The arms of the snap switches 59 and 60 join the poles 73, 75 and 73$^a$, 75$^a$, respectively. The brush 52 contacts with the plate 45. With the snap switches and disk 41 in the positions indicated in the preceding sentences, the circuit of the motor 61 which drives the reel of the projector 11 is closed. This circuit includes the conductor 23 connecting with the positive terminal of the source of electrical energy 63, conductor 67, motor 61, conductor 68, brush 52, plate 45, annular plate 44, brush 51, conductor 71 and conductor 72 which leads back to the negative terminal of the source of supply. The solenoid 30 is energized through the solenoid circuit which includes conductor 23 leading from the source of electrical energy 63, conductor 85, solenoid 30, conductor 83, arm 78 of the snap switch 59, and conductor 72 which leads to the negative terminal of the source of electrical energy. When this solenoid is thus energized the dowser plates 24 and 25 are held in the position shown in the diagram, allowing light rays to be emitted from the projector. As the film is passed through the projector, removing it from the reel with which the switch assemblage 10 is associated, the arm 20 swings downward, rotating the eccentric disk 17, forcing the contact arm 15 toward the contact arm 14. When the film has nearly all been removed from the above-mentioned reel, the arm 20 swings far enough downward to move the spring contact arms 14 and 15 into contact with one another. This closes a new circuit and current flows from the positive pole of the source of electrical energy through conductor 23, switch 10, conductor 22, pole 75ª, switch arm 77, conductor 81, motor 32 and back to the negative terminal of the source of electrical energy through conductor 72. Thus the motor 32 is set in operation, rotating the disk 41 and the shafts of the snap switches 59 and 60. The shafts of the snap switches turn through nearly one-quarter of a revolution before the arms 77 and 78 move. The plate 45 continues to contact with the brush 52, thus maintaining the circuit of the motor 61 until the film 21 has been completely passed through the projector. Just before the plate 45 passes out of contact with the brush 52 the arms of the snap switches move, setting up new circuits and breaking old ones. The plate 47 then contacts with the brush 53. Current now flows from the positive terminal of the source of supply through conductor 66, solenoid 30ª, pole 74, switch arm 78, pole 76 and back to the negative terminal through conductor 72. Thus the dowser plates 24ª and 25ª are drawn upward. These dowser plates are located in front of the second projector which is now ready for operation. As soon as the dowser plates 24ª and 25ª are drawn upward, the plate 47 contacts with the brush 53 and current flows through conductor 66, motor 62 which drives the second projector, conductor 69, brush 53, plate 47, annular plate 44, brush 51 and back to the negative terminal of the source of supply through the conductor 72. The plates 45 and 47 are so designed that as soon as the plate 47 contacts with the brush 53 the plate 45 breaks contact with the brush 52. Thus as soon as the second projector is set in operation the first projector is stopped by the breaking of the circuit of motor 61. This motor circuit is broken by the plate 45 moving out of contact with the brush 52. The rotation of the arm 77 of the snap switch 60 breaks the circuit of the motor 32 and the shafts 40, 57 and 58 cease to rotate as soon as the motor circuit is broken.

A new film is now placed in the magazine of the first projector and the machine prepared for further operation. As soon as the film of the second projector has been completed the switch 10ª is closed and current flows from the source of electric energy to conductor 66, switch 10ª, switch arm 77 which now contacts with the pole 74ª and 76ª, motor 32 and back to the source of electric energy through conductor 72. Thus the motor 32 is again set in operation and the circuit of motor 62 is broken while the circuit of motor 61 is re-connected. And so motion picture projectors may be successively set in operation continuously, using either two or more projectors.

In the operation of the above described device it has been assumed that the disk 41 is rotated counter-clockwise. Considering the snap switches 59 and 60 it is immaterial in which way the disks are rotated.

I would state in conclusion that while the illustrated example constitutes a practical embodiment of my invention, I do not limit myself strictly to the exact details herein illustrated since manifestly the same can be considerably varied without departing from the spirit of the invention as defined in the appended claims.

Claims.

1. In combination with a plurality of motion picture projectors including reels carrying films, separate motors for driving the reels and magnet controlled dowsers, a device for controlling the dowsers and setting the projectors into operation successively, comprising means for setting one motor in operation and stopping another, means for opening one dowser and closing another, a motor for operating the motor controlling means and the dowser controlling means, and switches controlled by the thickness of film wound on the reel for setting the last-mentioned motor into operation.

2. In combination with a plurality of moving picture projectors including reels carrying films, separate motors for operating the reels and the dowsers carried by the armature of solenoids, of means for controlling the dowsers and setting the projectors into operation successively, said means comprising means for setting one motor in operation and stopping the other, means for energizing one solenoid and deenergizing the other solenoid for opening one dowser and closing the other, a motor for operating the motor controlling means and the dowser controlling means, and switches controlled by the film and setting in operation the last named motor.

3. In combination with a plurality of moving picture projectors including reels carrying the films, electrically operated dowsers, and motors for operating the reels and dowsers, of circuit making and breaking means for the motor circuits to set them in operation successively, a plurality of snap switches for controlling the dowser operating means, a motor for operating the circuit making and breaking means and the snap switches, and switches controlled by the film on the reels for setting in operation the motor operating the said switches, one of the snap switches serving to break the supply circuit of its operating motor.

4. In combination with a plurality of moving picture projectors including reels carrying films mounted in the projectors, motors for operating the reels and dowsers operated by solenoids, a device of the class described comprising a disk provided with means for making and breaking the motor circuits to set them in operation successively, a plurality of snap switches for controlling the energizing of the dowser solenoids, a motor for operating the disk and snap switches, and switches controlled by the thickness of film wound on the reels for setting the disk operating motor into operation, one of said snap switches serving to break the supply circuit of its operating motor.

5. In combination with a plurality of motion picture projectors including reels carrying films, motors for driving each projector and dowser, a device of the class described comprising snap switches for controlling the operation of the dowsers, a disk provided with means for setting the projector motors in operation successively, a motor for operating said snap switches and disk, means controlled by the amount of film on the reel for setting the disk operating motor in operation, and means interposed between the disk operating motor and the members it operates for rotating the snap switches through ninety degrees while the disk is rotated through sixty degrees.

6. In a device of the class described for setting motion picture projectors in operation successively including a disk provided with means for successively making and breaking motor circuits and snap switches for controlling the operation of the dowsers, means for operating said circuit breaking means and snap switches comprising a motor, a train of gears driven by said motor for rotating the snap switches through ninety degrees while the disk is rotating through sixty degrees, and means for setting the motor in operation.

7. A device of the class described for successively setting motion picture projectors in operation, comprising a disk having a plurality of arc-shaped plates mounted thereon, means associated with the disk for supplying electrical energy to the arc-shaped plates, a plurality of snap switches, a motor for operating the disk and snap switches, and a train of gears interposed between the motor and the driven members for rotating the snap switches at the desired speed relative to the disk.

8. In a device of the class described for operating motion picture projectors successively, a disk having three arc-shaped plates mounted thereon and spaced from one another, means for connecting the arc-shaped plates to a source of electric energy, two three-way snap switches, a motor for operating said disk and snap switches, and gears interposed between the motor and the driven member for rotating the snap switches through ninety degree while the disk is rotated through sixty degrees.

9. In a device for successively setting in operation a plurality of moving picture projectors, the combination with two projectors, each including reel carrying films, dowser, and a motor for operating the reel and dowser, of controlling means for the reels and dowsers, a motor for operating said controlling means and means for setting in operation the last named motor, said means consisting of spaced contact plates, a shaft above the plates and having an arm provided with a roller and adapted to engage the film, and an eccentric on said shaft and adapted to engage one of the contact plates to force it into contact with the other plates.

NIELS HOINESS.